(12) United States Patent
Vook et al.

(10) Patent No.: US 7,152,178 B1
(45) Date of Patent: Dec. 19, 2006

(54) METHOD AND SYSTEM FOR DETECTING PATH FAILURE AND PERFORMING INPUT/OUTPUT RECOVERY IN A MULTI-PATH INPUT/OUTPUT SYSTEM

(75) Inventors: Eric R. Vook, Durham, NC (US); Michael Burriss, Raleigh, NC (US); Mike Bezera, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 1002 days.

(21) Appl. No.: 09/814,994

(22) Filed: Mar. 22, 2001

(51) Int. Cl.
*G06F 11/00* (2006.01)
(52) U.S. Cl. .............. 714/4; 714/43; 370/225
(58) Field of Classification Search ........... 714/4, 714/43; 370/225
See application file for complete search history.

(56) References Cited

U.S. PATENT DOCUMENTS

| | | | | |
|---|---|---|---|---|
| 5,408,646 A | * | 4/1995 | Olnowich et al. ............ | 714/4 |
| 5,781,528 A | * | 7/1998 | Sato et al. .................. | 370/218 |
| 5,805,786 A | * | 9/1998 | Badovinatz et al. ........... | 714/4 |
| 6,260,120 B1 | * | 7/2001 | Blumenau et al. .......... | 711/152 |
| 6,594,775 B1 | * | 7/2003 | Fair ............................. | 714/4 |
| 6,594,776 B1 | * | 7/2003 | Karighattam et al. .......... | 714/4 |
| 6,609,165 B1 | * | 8/2003 | Frazier ....................... | 710/36 |
| 6,718,480 B1 | * | 4/2004 | Ogura et al. .................. | 714/4 |
| 6,725,295 B1 | * | 4/2004 | Iwatani ....................... | 710/38 |
| 6,732,186 B1 | * | 5/2004 | Hebert ....................... | 709/239 |
| 2002/0078395 A1 | * | 6/2002 | Wachel ........................ | 714/4 |
| 2002/0097461 A1 | * | 7/2002 | Patel et al. ................. | 359/110 |

\* cited by examiner

*Primary Examiner*—Robert Beausoliel
*Assistant Examiner*—Yolanda L Wilson
(74) *Attorney, Agent, or Firm*—A. Jose Cortina; E. Kevin Perkins; Daniels, Daniels & Verdonik, P.A.

(57) ABSTRACT

The method and system provides for continuing issuance of input/output requests on a fabric having a plurality of paths connected to adapters on a computer managing the input/output requests. If a change in a path within the fabric occurs, a registered state change notification is typically issued on the fabric which is detected. The fabric on which the input/output request was issued is searched for a path failure, and if a failure is detected, a path is recovered.

17 Claims, 5 Drawing Sheets

Unsolicited Request Flow Chart continued

Unsolicited Request Flow Chart

Unsolicited Request Flow Chart continued

Auto Recovery Flow Chart  Fig. 4

Auto Failover Flow Chart

METHOD AND SYSTEM FOR DETECTING PATH FAILURE AND PERFORMING INPUT/OUTPUT RECOVERY IN A MULTI-PATH INPUT/OUTPUT SYSTEM

BACKGROUND OF THE INVENTION

1. Field of the Invention

The invention related to a method and system for performing faster path failure detection and input/output recovery on multi-path input/output configurations. More specifically, the invention provides such a method and system in high-availability configurations such as NUMA class servers, where multiple hardware components and controllers are connected to the same array of hardware. Since multiple components and controllers can be connected to the same array, there can be multiple paths configured in the operating system. The multiple paths are used to increase input/output throughput by performing input/output load balancing across various configured paths.

2. Background of the Invention

As noted previously, in high-availability configurations where multiple-path input/output (I/O) operations can be conducted, such as in the NUMA class server environments, multiple hardware controllers are potentially connected to the same array of hardware. Since multiple controllers can be connected to the same array, there can be multiple paths configured in the operating system of the servers. The multiple paths are used to increase I/O throughput by performing I/O load balancing across various configured paths.

These systems are generally known as fabric switched environments and in the case where multiple paths are configured for a given hardware device, identified by a logical unit number (LUN), a failure in an I/O operation can go unnoticed for an unacceptable period of time.

Currently, methods of asynchronous event notifications are defined by IEEE fabric switch standards. Such methods are sometimes referred to by the term Extended Link Service (ELS) command that can be received from a fabric switch in the event a change occurs in the state of a device connected and logged into the fabric. One form of ELS command is generally referred to as a registered state change notification (RSCN). Specifically, when a hardware component fails or is removed, an RSCN is generated for all connected devices that have registered with the fabric through standard documented procedures.

In the past, when an inactive path failed, it was not noticed until an event occurred on an active path. An event on an active path caused the upper level components to activate the inactive path. Since the inactive path had failed, both the active and inactive paths were dead and no I/O could be issued. By the term "active path" is meant a path within the file system or operating system on which an I/O operation can be performed. By the term "inactive path" is meant a path within the file system or operating system that has the potential of being used, but is not being used, and is not dead. A "dead path" is a path on which no I/O operations can be performed.

In the event of such failure, recovery required manual intervention from an administrator after a failure, who then tried to activate the inactive path.

In accordance with the system and method described herein, the disadvantages of the prior methods and systems were failures in paths involving I/O operations which were not easily and quickly detected, and required manual intervention to be repaired, are avoided. An automated method of detecting such failures and recovering to allow continuation of I/O operations is described herein. By the term "repair" is meant that a path is repaired in the operating system to allow I/O operations to resume, and does not necessarily mean physical repair such as replacement of cable.

SUMMARY OF THE INVENTION

In one aspect, the invention involves a method of reissuing and allowing reissuance of an input/output request onto a fabric from a plurality of paths connected to adapters on a computer managing input/output requests, over a network which includes the fabric, in the event the input/output request is issued on a failed path. By the term "network" is meant a plurality of components interconnected together. The method includes a first step of detecting a registered state change notification (RSCN). If an RSCN is detected, the fabric on which the input/output request was issued is searched for a path failure, and if a failure is detected, the path is recovered. By the term "recovered" is meant a repair of the path and/or selection of the alternate path.

In a more specific aspect, the recovery step involves recovering the path on which the initial input/output (I/O) request was issued. Yet more specifically, the method involves also determining if a non-failed path is available, and if available, I/O operations are resumed or potentially allowed to resume on the detected non-failed path while the attempt to repair the failed path proceeds.

Yet still further, when an alternate non-failed path is selected, the outstanding I/O request is aborted, and the I/O request on the non-failed path is resumed. In the event that the repair of the path is successful, non-file system structures are updated to represent the repair state and the path is marked as capable of input/output requests. Thereafter, the I/O request can be resumed on the repaired path if needed.

In an alternative aspect, there is disclosed a computer system having at least one computer connected on a fabric switch network, with multiple adapters on the computer managing paths on the fabric to multiple hardware components connected on the network. The computer includes an operating system resident on the computer which is programmed to recognize a registered state change notification (RSCN) from a hardware component, and to issue an I/O request to the hardware component on another path in response thereto.

Yet still further, the RSCN is indicative of a path failure, or a path becoming available, for a path on which the input/output operations were attempted, and the operating system is programmed to attempt to recover a failed path.

The system is further configured for distinguishing whether an RSCN received is a hardware component RSCN, a Domain RSCN, an Area RSCN, or a Port RSCN, so that the appropriate recovery operation can be conducted in accordance with the type of RSCN received.

BRIEF DESCRIPTION OF THE DRAWINGS

Having thus briefly described the invention, the same will become better understood from the following detailed discussion, made with reference to the appended drawings wherein.

DETAILED DISCUSSION THE INVENTION

The system and method described herein is implemented in the context of a fibre channel system. Such systems can be implemented in various ways. One arrangement involves a fibre channel loop which involves, for example, a series of hardware components such as storage arrays connected in a loop to a host system controlling the arrays. Communications between the various components are conducted asynchronously. The host can be a server running one of a number of possible operating systems. The storage arrays can be arrays such as those commercially available under the name Clariion from EMC Corporation. Such systems are limited in terms of the number of components that can be connected to the host because a limitation of such loops is that, for example, they only support 128 fibre identification numbers (FIDs), i.e., FID 0-127.

Figure 1:
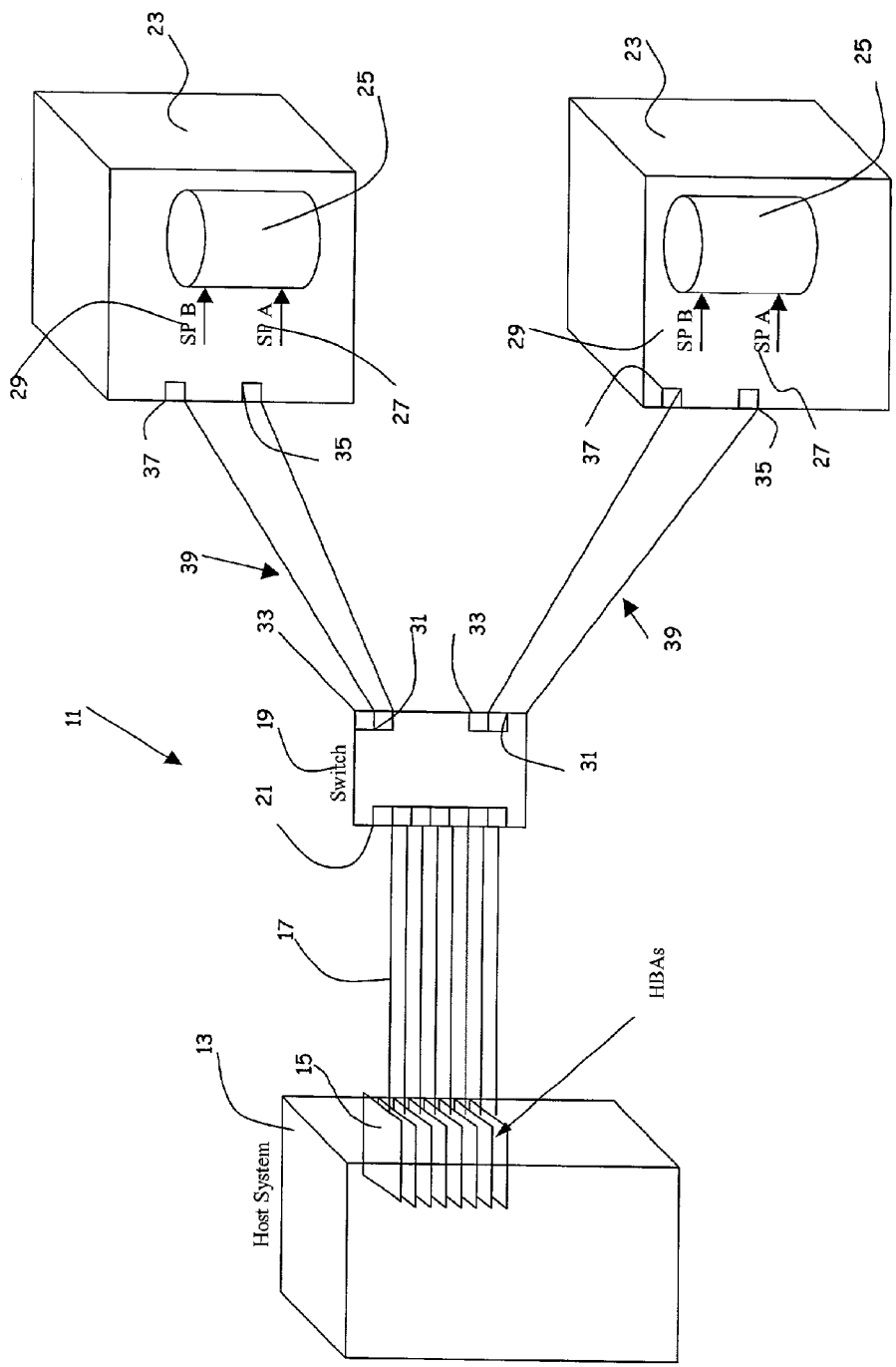
FIG. 1 is a simplified block diagram of a partial typical system arrangement in which the method and system described herein are implemented.

For larger systems, a fibre channel system involves an arrangement that looks like a network. FIG. 1 serves as a simplified partial illustration of such a system 11. In this case a host 13, such as a server, includes a set of adapters 15 connected to a cable 17 which is typically conventionally known in this environment as a fibre channel 17 establishing a plurality of paths for managing input/output requests. The cable 17 is connected to a plurality of ports 21 at a switch 19. The switch 19 then routes the I/O request through ports 31, 33 through cable connections 39 to respective ports 35 and 37 on cabinets 23 having disk arrays 25 thereon controlled by respective storage processors 27 and 29 for each array. The switch 19 can be, for example, like those manufactured and made commercially available by companies such as Brocade, Anchor, and McData Corporation.

Typically the switches 19 provide an extension of the loop protocol previously described and each adapter 15 has its own connection to one of the ports 21 on the switch 19. The cabinets 23 housing disk arrays 25 can be, for example, of the type commercially available from EMC Corporation under the names Clariion and Symmetrix and have their storage processors 27 and 29 connected to their own ports 35 and 37 for connection to ports 31 and 33 at the switch 19. While the systems available from EMC Corporation have been mentioned herein, the system and method is not limited to such systems, and other like systems can be substituted in place thereof.

In a loop environment, it is easy to recognize whether there is a path failure because if one device or path goes down, the host notices it because the return link is broken. On the other hand, in the environment illustrated in an exemplary manner by the system 11 of FIG. 1, a path failure typically is not noticed because the host 13 can still connect and communicate with the fibre channel 17. In such a case, the host does not know that the fabric cannot get through to the disk array 25 beyond the switch 19. This is because in such a case, the host 13 is not communicating with the fabric.

For purposes of this disclosure, it should be noted that one or more switches with the associated hardware components connected thereto together constitute what is conventionally known by those of ordinary skill in the art as the "fabric."

Further, for purposes of clarity, while FIG. 1 shows the system 11 in a simplified form, in actual implementation, the host 13 communicates with what is generally known as the fabric. It goes through switches 19 which are daisy-chained together in a situation where only one of the switches is in control, and the rest of them do what it tells them to do.

Thus, in operation, a plurality of cabinets 23 containing storage arrays 25 controlled by storage processors 27 and 29 are connected to the switch 19. When the host 13 has devices configured into the kernel of the operating system, for each adapter 15, each adapter 15 asks the fabric what devices are connected. Specifically, communication is established between the host 13 and the storage processors 27 and 29, and, for example, an identification indicates to the kernel that a storage processor was discovered, for example, connected at Port 4 and another storage processor connected at Port 3. The host system 13 then configures the two storage processors into the system as it would for the storage processors for any other cabinet 23 containing a storage array 25 controlled by storage processors.

The host 13 can then issue input/output requests. The host system 13 logs into the switch 19 to obtain the Port ID for a particular storage processor 27 or 29, and logs into the disk array 25. It should be noted that by the term "log in" is meant the conventional protocols within arbitrated loop standards, more commonly known as the handshake.

Once a configuration occurs, the switch 19 generates all the routing Ports and the host 13, now knowing how the storage processors 27 or 29 are connected through the Ports, knows how to send an I/O request to the individual disk arrays 25, similar to the same manner in it would be done with an internal hard disk to the host system 13.

Having thus described a typical system 11 configuration, it is noted that the current switch protocol for a system like system 11 shown in FIG. 1 allows for a method of providing asynchronous event notification. This is defined by IEEE fabric switch standards, and the method is oftentimes referred to as the Extended Link Service (ELS) command, that can be received from a fabric switch in the event a change occurs in the state of a device. One form of ELS command is more generally known as a registered state change notification (RSCN). In an arrangement like system 11, under current implementations, when a hardware component fails or is removed, an RSCN is generated for all connected devices that have registered through the fabric through the previously-described documented procedure.

Accordingly, according to the system and method described herein, when an RSCN is received by the host 13, the operating system is programmed to issue another input/output (I/O) request on another configured path to the same device that failed or was removed. In this manner, the operating system no longer needs to rely on I/O timeouts to know that the target device is not longer reachable.

The RSCN can also be used to be determine if a device the operating system had logged as previously failed is now responding. The path to the device is then auto-recovered as described later herein, while the operating system continues to perform I/O requests to the target device from other paths. When the system operator performs the repair operation to repair the file system entry, the work in the device driver portion of the kernel is complete and the file system repaired almost immediately, so that I/O requests can now be issued to the repaired path.

In cases when an inactive path is capable of being repaired by the operating system kernel, no operator involvement is required because the file system did not register the failure. In the system and method described, every device connected to a switched fabric has an assigned Port identification number (ID). If the device is physically moved, the Port ID changes, but the worldwide name (WWN) of the device never changes. Thus, if a device is moved from one port to another, then it would be re-discovered that it went away from the first port, but would then be discovered as it comes back online on a different port with a different Port ID.

Figure 2:
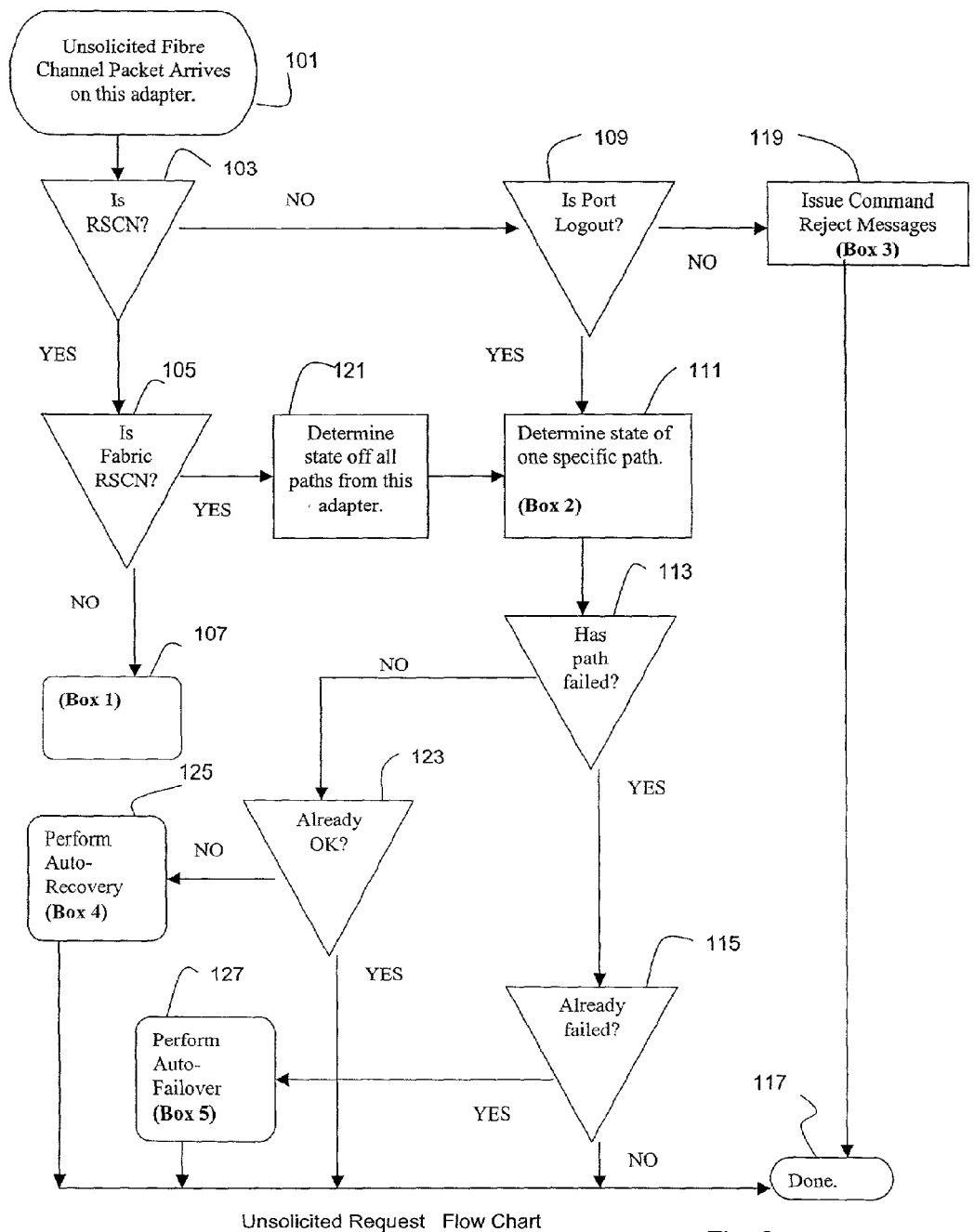
FIGS. 2 and 3 together make up a block diagram illustrating the overall method of detecting path failures, selecting alternate paths, and recovering a path in accordance with the method and system described herein.
Figure 3:
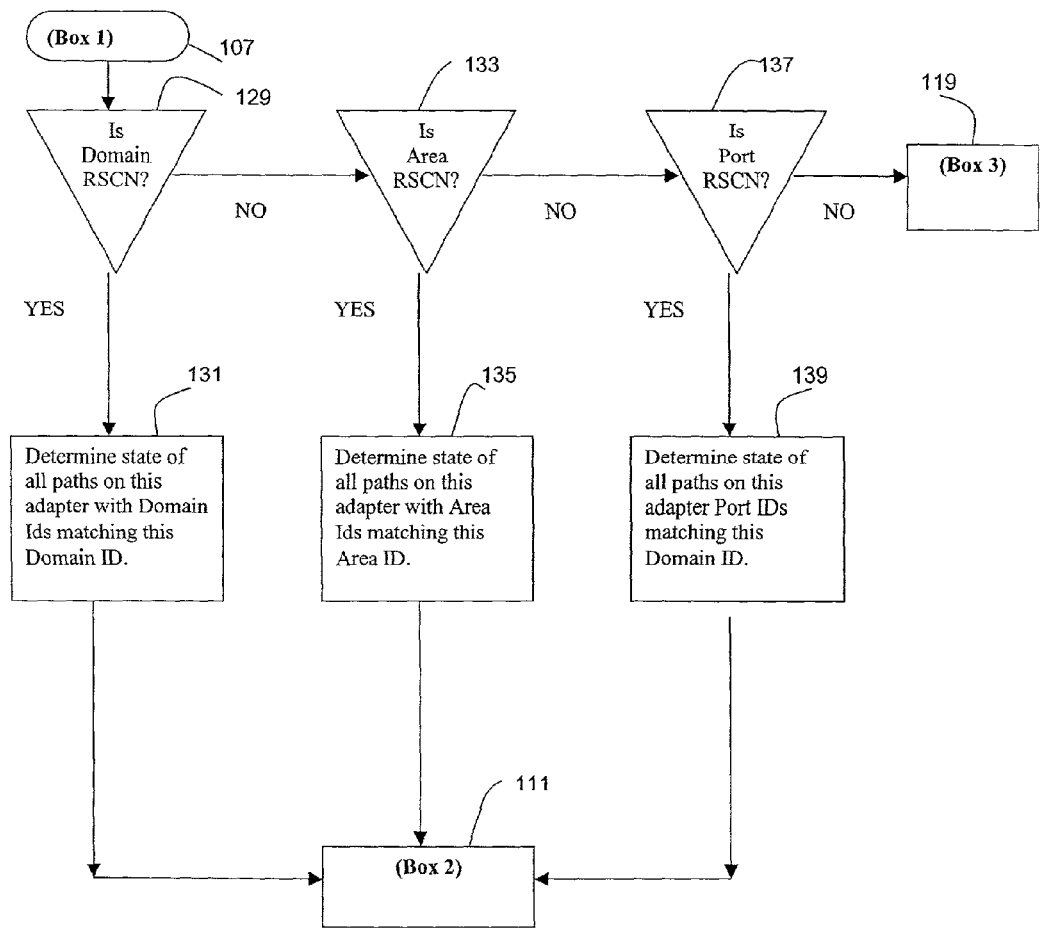
Figure 4:
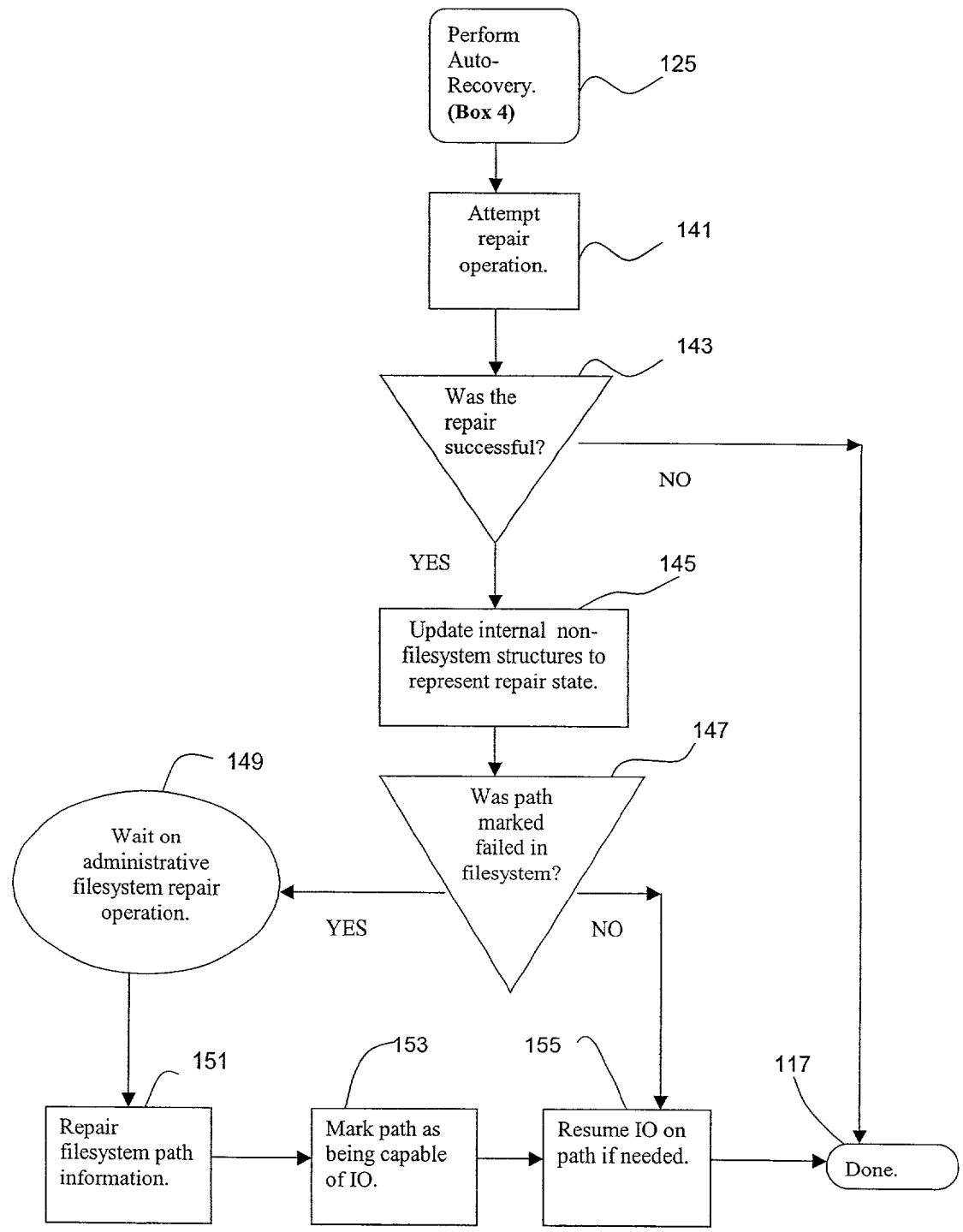
FIG. 4 is a block diagram illustrating in greater detail how a path is recovered.
Figure 5:
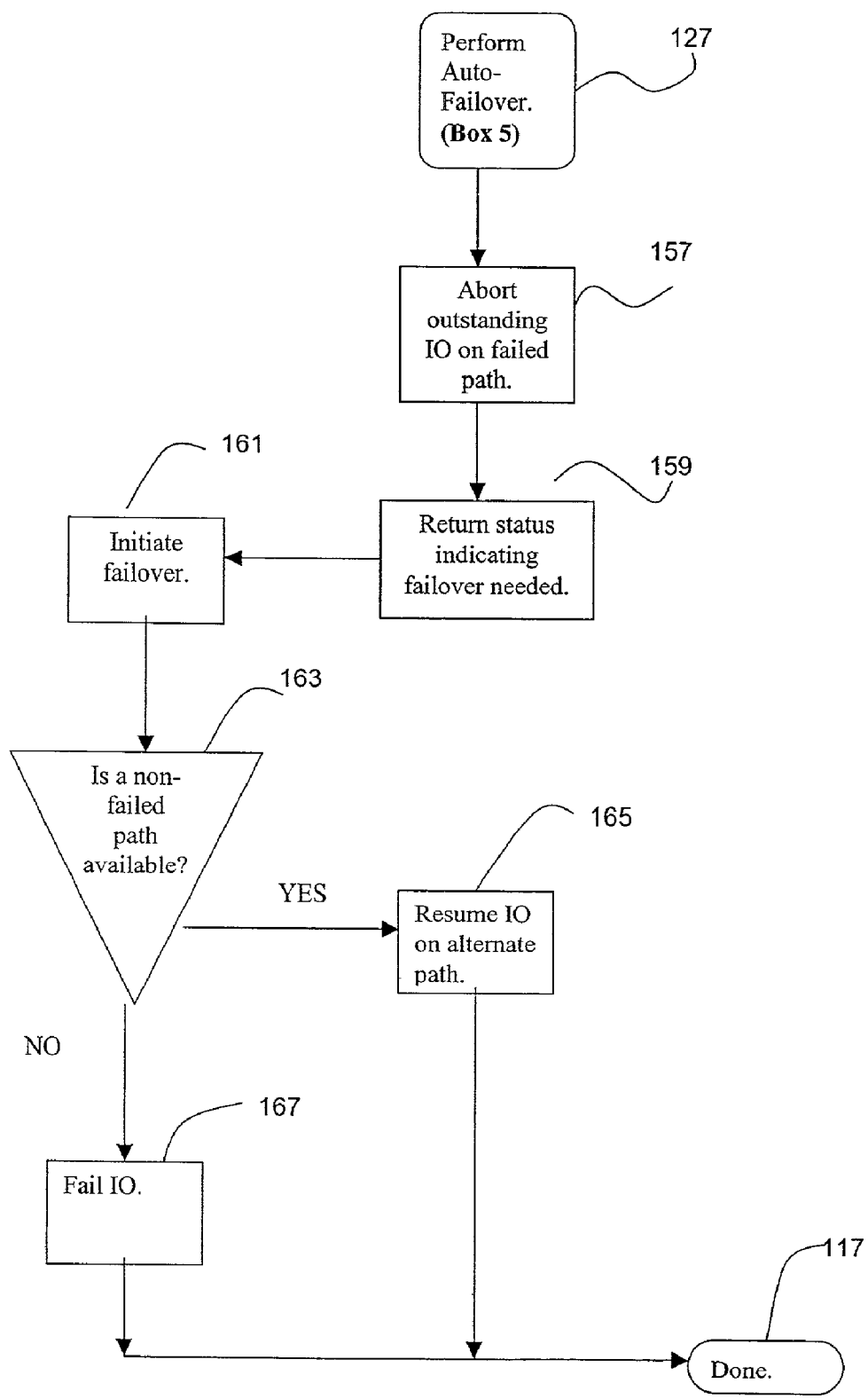
FIG. 5 is a block diagram illustrating in greater detail how an alternate path is selected and input/output operations resumed on that alternate path.

Having thus generally described the system and method, the same will become better understood from the following discussion made with reference to FIGS. 2, 3, 4 and 5. FIGS. 2 and 3 collectively illustrate the overall operation of the method. FIG. 4 illustrates in greater detail how repair of a path is performed, and FIG. 5 illustrates how in the event of failure of a path, I/O operations are resumed on an alternate path.

Turning now to FIG. 2, when the system 11 is operating, an unsolicited fibre channel packet may arrive at an adapter 15 of the host system 13 at step 101. An initial determination is made at step 103 as to whether it is an RSCN. If it is determined at step 105 that it is a Fabric RSCN, at step 121, a determination of the state of all of the paths from the particular adapter is made, and the method proceeds to step 111 where the state of one specific path is determined. An inquiry is made at step 113 requesting whether the path has failed. If the answer is no, then it proceeds to the end at step 117.

Alternatively, if the answer is yes, the process proceeds to step 127, where an alternative path is selected as described with reference to FIG. 5 hereafter. Returning to step 113, if there is a determination that the path has not failed, the method proceeds to step 123 where an inquiry is made as to whether the path is functioning. If the answer is yes, the method proceeds to step 117 and I/O operations continue as before. If the answer is no, the method proceeds to step 125, in which an attempt to recover the path is made as more specifically described with reference to FIG. 4.

Returning to step 105, if it is determined that the RSCN is not a Fabric RSCN, the method proceeds to step 107 as further illustrated in FIG. 3. A series of inquires are then made as to whether it is a Domain RSCN at step 129, an Area RSCN at step 133, or a Port RSCN at step 137. If the answer is no to all three, then the method proceeds to step 119 illustrated by box 3.

If the answer is yes to either inquiry in steps 129, 133 or 137, then the process proceeds as follows. For step 129, at step 131 the state of all paths on the particular adapter with Domain IDs matching the Domain ID of the RSCN is determined, and the process proceeds to step 111 of FIG. 2 and continues as previously described. For step 133, at step 135 the state of all paths on the particular adapter with Area IDs matching the Area ID of the RSCN is determined, and the process proceeds to step 111 of FIG. 2 and continues as previously described. For step 137, at step 139 the state of all paths on the particular adapter with Port IDs matching the Port ID of the RSCN is determined, and the process proceeds to step 111 of FIG. 2 and continues as previously described.

Turning again to FIG. 2, at step 103 if it is determined that the unsolicited fibre channel packet is not an RSCN, then an inquiry is made at step 109 as to whether it is a Port log out, and if the answer is no, the process issues a command reject message at step 119, and the process terminates at step 117. If the answer is yes with respect to the inquiry at step 109, then the process proceeds to step 111 to determine the state of one specific path, and thereafter proceeds as previously described with respect to FIG. 2.

Turning again to FIG. 2 at step 113, if a determination is made that the path has failed, and it is clear from the inquiry of step 123 that the path is not functioning, then auto-recovery is performed at step 125 which is discussed in greater detail with respect to FIG. 4.

In FIG. 4, an initial attempt to repair the path is made at step 141. Thereafter, at step 143 an inquiry is made as to whether the repair was successful, and if it was not, the method proceeds to step 117 at which time external operator intervention is required. If the answer is yes, the process proceeds to step 145 where the internal non-file system structures are updated to represent the repair state. At step 147 an inquiry is made as to whether the path was marked failed in the file system. If the answer is no, at step 155 I/O requests are resumed on the path, if needed, and the system returns to normal. If the answer is yes, at step 149 the path repair operation pauses (the system itself and underlying kernel continues to operate as normal) to wait on administrative file disk repair operations to be conducted, and once completed, at step 151 the file system path information is repaired. At step 153, the path is marked as being capable of I/O, and at step 155 I/O operations resume on the path, if needed, as previously discussed.

While the recovery operations described with reference to FIG. 4 are proceeding, I/O operations can continue as illustrated in greater detail in FIG. 5. More specifically, with reference to FIG. 2, the method proceeds to step 127 where alternative path selection or auto failover is conducted.

It is clear from FIG. 5 that if it is determined that the path has failed, at step 157 an outstanding I/O is aborted on the failed path. At step 159 a status return is generated indicating that selection of an alternate path is required. Selection of an alternate path is then initiated at step 161, with an initial inquiry made at 163 to determine if a non-failed path is available. If the answer is yes, at step 165 I/O requests are resumed on an alternate path and the system returns to step 117. If there is no non-failed path available, then at step 167, an indication that there is a failed I/O request is generated, and the system terminates operations at step 117, with manual intervention now required by the operator to determine what failed. Once the cause of the failure is determined, the recovery operation proceeds as previously described.

Having thus generally described the invention, the same will become better understood from the appended claims in which it is set forth in a non-limiting manner.

The invention claimed is:

1. A computer system having at least one computer connected on a fabric switched network, with at least one adapter on the computer managing paths on the fabric to multiple hardware components connected on the network, comprising:

an operating system resident on the computer programmed to recognize an RSCN indicative of a path failure from a change in a hardware component on the fabric and to issue an input/output (I/O) request to the hardware component on another path in response thereto.

2. The system of claim 1 wherein the operating system is programmed to continue to perform I/O request with the hardware component which caused the RSCN, while attempting to recover the failed path to the hardware component.

3. The system of claim 2 wherein the operating system is programmed for detecting if a non-failed path is available upon receipt of an RSCN from a hardware component, and for selecting a non-failed path, if available, for continuing I/O operations thereon.

4. The system of claim 1 wherein the operating system is programmed for detecting if a non-failed path is available upon receipt of an RSCN from a hardware component, and for selecting a non-failed path, if available, for continuing I/O operations thereon.

5. The system of claim 1 wherein the operating system is programmed for detecting whether an RSCN received is a Fabric RSCN, a Domain RSCN, an Area RSCN, or a Port RSCN.

6. The system of claim 1 wherein the operating system is programmed such that if a Fabric RSCN is received, the I/O request is aborted, a new non-failed path is selected and new input/output request is issued, if necessary, on the new non-failed path, and an attempt is made to repair the failed path.

7. The system of claim 1 wherein the operating system is programmed such that if a Domain RSCN is received, the I/O request is aborted, a new non-failed path is selected and new I/O request is issued if necessary on the new non-failed path, and an attempt is made to repair the failed path.

8. The system of claim 1 wherein the operating system is programmed such that if an Area RSCN is received, the I/O request is aborted, a new non-failed path is selected and new I/O request is issued, if necessary, on the new non-failed path, and an attempt is made to repair the failed path.

9. The system of claim 1 wherein the operating system is programmed such that if a Port RSCN is received, the I/O request is aborted, a new non-failed path is selected and new I/O request is issued, if necessary, on the new non-failed path, and an attempt is made to repair the failed path.

10. A method of continuing issuing of input/output requests on a fabric having a plurality of paths connected to adapters on a computer managing input/output (I/O) requests, on a network which includes the fabric, in the event input/output requests are issued on a failed path, comprising:
   detecting an RSCN issued on the fabric;
   searching the fabric on which said I/O request was issued for a path failure;
   determining if the RSCN detected is a Fabric RSCN, and if it is a Fabric RSCN,
   determining the state of all paths from a specified adapter that is managing the I/O request on the failed path;
   for a specific path, determining its state, and if the path has failed, recovering the path by attempting repair of the path;
   if the repair is successful, updating non-file system structures to represent the repair state;
   determining if the path was marked failed in the file system;
   if marked failed, repairing the file system path information;
   marking the path as capable if I/O requests; and
   receiving I/O requests on the path if needed.

11. A method of continuing issuing of input/output requests on a fabric having a plurality of paths connected to adapters on a computer managing input/output requests, on a network which includes the fabric, in the event input/output (I/O) requests are issued on a failed path, comprising:
   detecting an RSCN issued on the fabric;
   upon an RSCN being detected, determining if it is a Domain RSCN;
   determining the state of all paths on the adapter;
   managing the I/O request with Domain IDs matching the Domain ID of the Domain RSCN; and
   determining the state of one specific path on the adapter with a Domain ID matching the Domain ID of the Domain RSCN, and if the path has failed,
   recovering the path or selecting another path.

12. A method of continuing issuing of input/output requests on a fabric having a plurality of paths connected to adapters on a computer managing input/output requests, on a network which includes the fabric, in the event input/output (I/O) requests are issued on a failed path comprising:
   upon an RSCN being detected, determining if it is an Area RSCN;
   if it is an Area RSCN, determining the state of all paths on the adapter managing the-I/O request with Area IDs matching the Area ID of the Area RSCN;
   determining the state of one specific path on the adapter with an Area ID matching the Area ID of the Area RSCN, and if the path has failed, recovering the path or selecting another path.

13. A method of continuing issuing of input/output requests on a fabric having a plurality of paths connected to adapters on a computer managing input/output requests, on a network which includes the fabric, in the event input/output (I/O) requests are issued on a failed path comprising:
   detecting an RSCN on the fabric;
   upon an RSCN being detected, determining if it is a Port RSCN;
   if it is a Port RSCN, determining the state of all paths on the adapter managing the I/O request with Port IDs matching the Port ID of the Port RSCN;
   determining the state of one specific path on the adapter with a Port ID matching the Port ID of the Port RSCN, and if the path has failed, recovering the path or selecting another path.

14. A method of continuing issuing input/output requests on a fabric having a plurality of paths connected to adapters on a computer managing input/output requests, on a network which includes the fabric, in the event input/output (I/O) requests are issued on a failed path, comprising:
   detecting an RSCN issued on the fabric;
   upon an RSCN being detected, determining if it is a Fabric RSCN, and if it is a Fabric RSCN, determining the state of all paths from a specific adapter that is managing the I/O request on the failed path; and
   for a specific path, determining its state, and if the path has failed, one of selecting an alternate non-failed path on which to issue I/O requests or recovering the path.

15. The method of claim 14, wherein said recovering step comprises recovering the path on which the initial I/O request was issued.

16. The method of claim 14, wherein said recovering step comprises detecting if a non-failed path is available, and if a non-failed path is available, resume I/O operations on the detected non-failed path.

17. The method of claim 14, wherein said selecting of an alternate path comprises:
   aborting an outstanding I/O request on the failed path;
   issuing a status request indicating selection of a non-failed path is needed;
   determining if a non-failed path is available; and
   if a non-failed path is available, resuming the I/O request on the non-failed path.

* * * * *